Oct. 9, 1951   W. G. THOMAS   2,570,733
RECEPTACLE FOR FEEDING LIQUID FOOD TO HUMMING BIRDS
Filed June 3, 1947
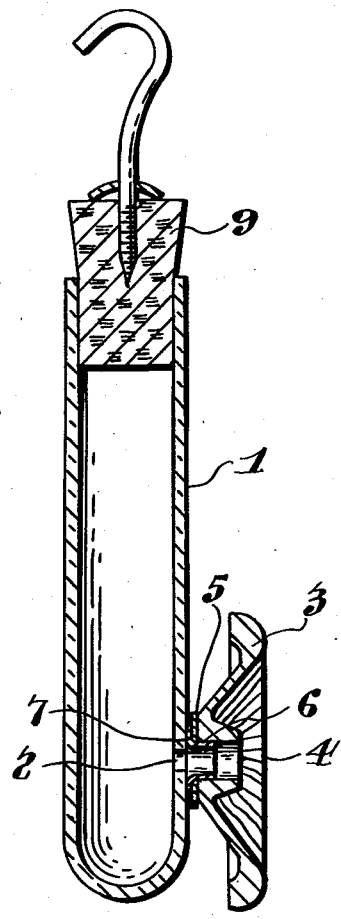
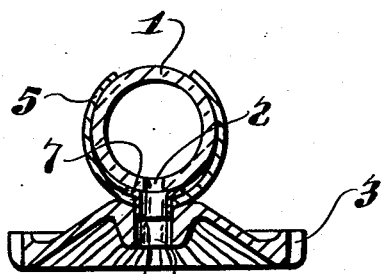
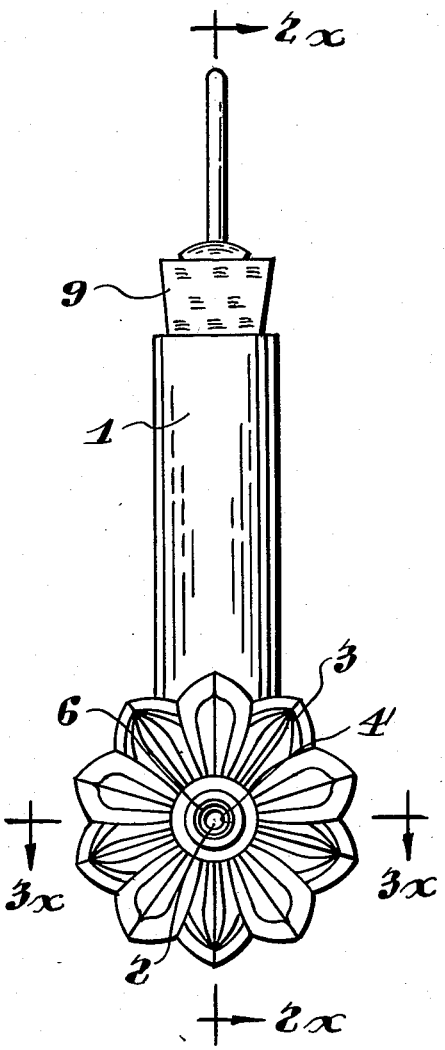
INVENTOR.
William G. Thomas Patented Oct. 9, 1951

2,570,733

UNITED STATES PATENT OFFICE 2,570,733

RECEPTACLE FOR FEEDING LIQUID FOOD TO HUMMING BIRDS

William G. Thomas, Medina, N. Y.

Application June 3, 1947, Serial No. 752,045

12 Claims. (Cl. 119—72)

1

Humming birds and bees both feed on the nectar of flowers and they will also feed on honey or sugar and water whenever it is offered to them.

The object of this invention is to provide an artificial supply of food for humming birds for the purpose of attracting them and make the food inaccessible to bees at the same time that will otherwise be attracted, leaving the food accessible to small insects on which the humming birds may feed.

Another object of the invention is to decorate the food container with an artificial flower that will attract the humming birds.

Another object of the invention is to provide a device that can be hung up outdoors anywhere in places that are accessible to the humming birds.

These and other objects of the invention will be illustrated in the drawings, described in the specification and pointed out in the claims at the end thereof.

In the drawings:

Figure 1 is a front elevation of the device.

Figure 2 is a vertical section, the section being taken on the line 2x, 2x of Figure 1.

Figure 3 is a horizontal section, the section being taken on the line 3x, 3x of Figure 1.

In the drawings, like reference numerals indicate like parts.

In the drawings reference numeral 1 indicates a tube that normally stands or is hung in an upright position. This tube is open at the top and is closed at the bottom and has a hole 2 formed in the side thereof near the bottom thereof. Numeral 3 is an artificial flower made of metal or plastic having a hole 4 centrally therein. Numeral 5 is a metal sleeve adapted to clamp the tube and hold itself in place by friction thereon. Through this sleeve extends an eyelet 6 having a base 7 which normally rests against the tube. This eyelet has a hole through it and the forward extension of the eyelet extends into the hole 4 in the artificial flower and holds the flower in place on the metal sleeve 5. This sleeve with its flower can slide up or down on the glass tube 1 and is placed thereon so that the hole in the flower and eyelet is concentric with or in line with the hole 2 in the glass tube.

The glass tube is filled with honey, sugar water or molasses, etc., and the upper open end thereof is plugged with a cork 9, which holds the liquid in the tube and prevents it from running out through the opening in the tube even though the liquid stands in the tube several inches above the opening 2. It does this by creating a partial

2 vacuum in the tube in the ordinary well-known manner.

In the absence of the flower and the eyelet, bees could get access to the contents of the tube, because although they have short proboscises, yet they would be long enough to reach through the opening 2 in the tube but by lengthening out the hole or making it deeper by adding the eyelet and the sleeve 5 in the flower, the hole is made much longer than the length of the tongue or proboscis of the bee but is not too long for the tongue or bill of the humming bird which can reach through it into the liquid in the tube.

It will be understood that the tongue or proboscis of the honey bee is about ¼" long and the tongue of the humming bird is an inch or more in length or much longer than the tongue of the bee.

It will also be understood that the liquid in the tube will attract small insects, some of which will get stuck in place and on these the humming bird will feed. The flower attracts the bees and the humming bird and the central opening in the flower and eyelet and tube is deep enough to prevent the bees from getting the sweet liquid in the tube, but is not deep enough to prevent the humming bird from getting the sweet liquid in the tube.

It will be understood that a natural flower could be used instead of an artificial flower but experience with an artificial flower has shown that it is sufficient and is more durable.

I claim:

1. In a device for feeding liquid food to humming birds the combination of a food container having liquid food held therein by a partial vacuum, said container having an outlet hole in the side thereof, said hole being too deep to permit the food to be reached by a honey bee and shallow enough to permit the food to be reached by a humming bird.

2. In a device for feeding liquid food to humming birds the combination of a food container having liquid food held therein by a partial vacuum, said container having an outlet hole in the side thereof, said hole being too deep to permit the food to be reached by a honey bee and shallow enough to permit the food to be reached by a humming bird, and a flower surrounding said hole to attract humming birds said flower having a hole therein adapted to make the hole deeper.

3. In a device for feeding liquid food to humming birds, the combination of a tubular container closed at the bottom and capable of being opened at the top, said container having liquid food held therein by a partial vacuum, said container having an outlet hole in the side thereof, a sleeve frictionally engaged with the tubular container, an eyelet and a flower supported on said sleeve, said assembly of sleeve, eyelet and flower having a hole therethrough that can be placed in line with the hole in the container, the hole of the combination being too deep to permit the food to be reached by a honey bee and shallow enough to permit the food to be reached by a humming bird.

4. In a device for feeding liquid food to humming birds, the combination of a tubular container closed at the bottom and capable of being open at the top, said container having liquid food held therein by a partial vacuum, said container having an outlet hole in the side thereof, means for holding a flower centrally in front of said hole, said flower having a hole therein, the two holes together being too deep to permit the food to be reached by a honey bee and shallow enough to be reached by a humming bird said holes in combination being more than ¼" in depth.

5. In a device for feeding liquid food to humming birds, the combination of a tubular container closed at the bottom and capable of being open at the top, said container having liquid food held therein by a partial vacuum, said container having an outlet hole in the side thereof, means for holding a flower centrally in front of said hole, said flower having a hole therein, the two holes together being too deep to permit the food to be reached by a honey bee and shallow enough to be reached by a humming bird, said holes in combination being more than ⁴⁄₁₀" in depth.

6. In a device for feeding liquid food to humming birds, the combination of a tubular container closed at the bottom and capable of being open at the top, said container having liquid food held therein by a partial vacuum, said container having an outlet hole in the side thereof, means for holding a flower centrally in front of said hole, said flower having a hole therein, the two holes together being too deep to permit the food to be reached by a honey bee and shallow enough to be reached by a humming bird, said holes being in combination about ½" in depth.

7. The combination of a tube having a bottom that is normally closed, an opening at the top that is closed by a cork, an outlet hole in the side of the tube near and above the bottom thereof and remote from the top, said container being filled with a liquid food to a level higher than the outlet hole in the side thereof, said liquid food being held in the tube at the high level by a partial vacuum created by the cork.

8. The combination of a glass tube having a bottom that is normally closed and an opening at the top that is closed by a cork, an outlet hole in the side of the tube near and above the bottom thereof and remote from the top, said container being filled with a liquid food to a level higher than the outlet hole in the side thereof, said liquid food being held in the tube at the high level by a partial vacuum created by the cork.

9. The combination of a glass tube having a bottom that is normally closed and an opening at the top that is closed by a cork, an outlet hole in the side of the tube near and above the bottom thereof and remote from the top, said container being filled with a liquid food to a level higher than the outlet hole in the side thereof, said liquid food being held in the tube at the high level by a partial vacuum created by the cork, a hook in the cork by which the assembly of tube and cork can be supported from the hook.

10. In a device for feeding liquid food to humming birds the combination of a tubular container closed at the bottom and capable of being opened at the top, said container having liquid food held therein by a partial vacuum, an outlet hole in the side of the container, a sleeve frictionally engaged with the tube and having an eyelet therein having a hole therethrough that can be placed in line with the hole in the container, the hole of the container and eyelet being too deep to permit the food to be reached by a honey bee and shallow enough to permit the food to be reached by a humming bird.

11. In a device for feeding liquid food to humming birds the combination of a tubular container closed at the bottom and capable of being opened at the top, said container having liquid food held therein by a partial vacuum, an outlet hole in the side of the container, a sleeve frictionally engaged with the tube and having an eyelet therein having a hole therethrough that can be placed in line with the hole in the container, thereby increasing the length of the hole through which the food in the tube must be reached by the bill of a humming bird.

12. In a device for feeding liquid food to humming birds the combination of a tubular container closed at the bottom and capable of being opened at the top, said container having liquid food held therein by a partial vacuum, an outlet hole in the side of the container, a tubular extension extending out from the hole in the tube and held in line therewith.

WILLIAM G. THOMAS.

REFERENCES CITED

The following references are of record in the file of this patent:

UNITED STATES PATENTS

| Number | Name | Date |
|---|---|---|
| 466,397 | Day | Jan. 5, 1892 |
| 811,870 | Quittner | Feb. 6, 1906 |
| 2,267,883 | Wood | Dec. 30, 1941 |

OTHER REFERENCES

Popular Mechanics, December 1946, pages 123 through 126.